Oct. 31, 1950
H. G. BELL ET AL
2,527,672
CONNECTION FOR THE ENDS OF HOOP
SECTIONS FOR KNOCKDOWN BARRELS
Filed Aug. 12, 1946
2 Sheets-Sheet 1
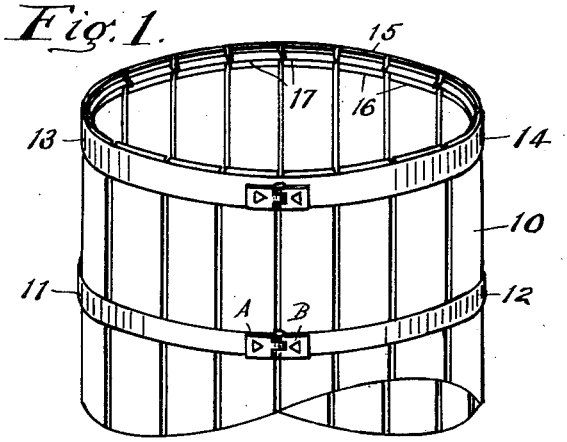
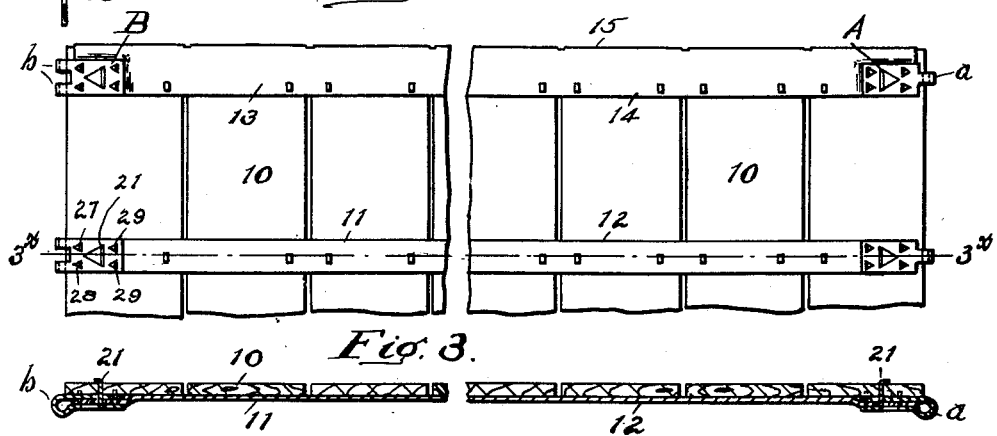
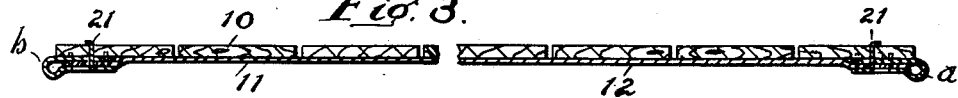
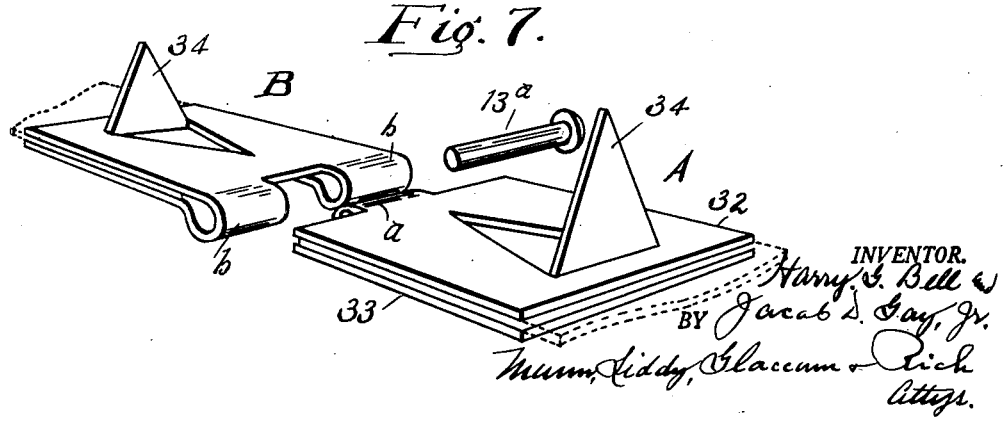
INVENTOR.
Harry G. Bell
BY Jacob L. Gay, Jr.
Munn, Liddy, Glaccum & Rich
Attys.

Oct. 31, 1950 H. G. BELL ET AL 2,527,672
CONNECTION FOR THE ENDS OF HOOP
SECTIONS FOR KNOCKDOWN BARRELS
Filed Aug. 12, 1946 2 Sheets-Sheet 2
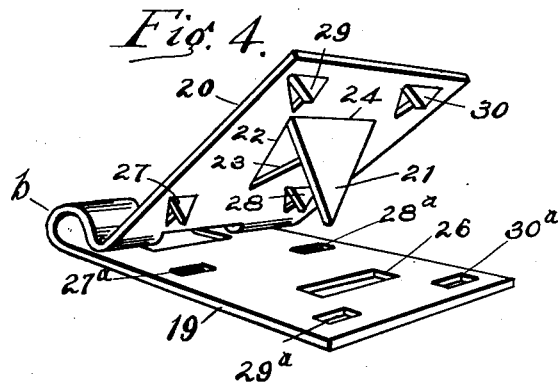
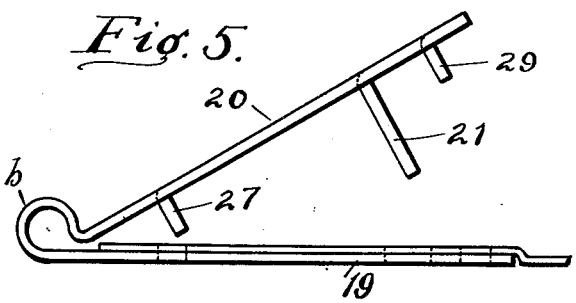
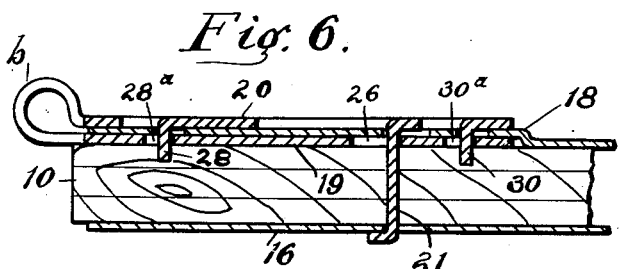
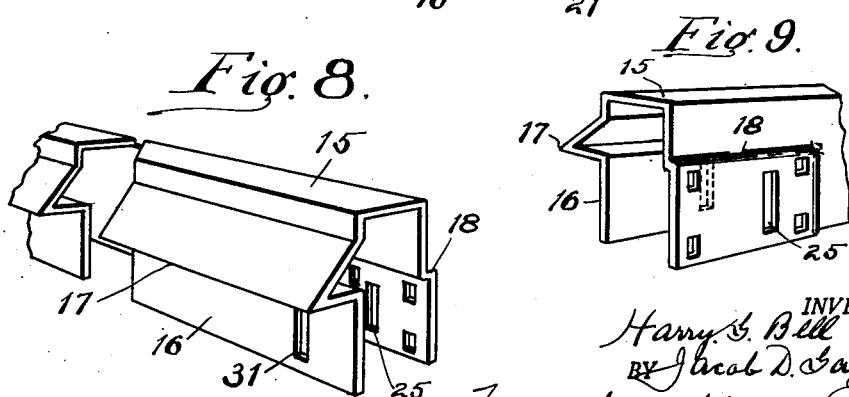
INVENTOR.
Harry G. Bell and
BY Jacob D. Gay, Jr.
Munn, Liddy, Gloccum & Dick
Attys Patented Oct. 31, 1950

2,527,672

UNITED STATES PATENT OFFICE 2,527,672

CONNECTION FOR THE ENDS OF HOOP SECTIONS FOR KNOCKDOWN BARRELS

Harry Guthrie Bell, Paris, and Jacob Douglas Gay, Jr., Lexington, Ky., assignors to Gay-Bell Corporation, Paris, Ky., a corporation of Kentucky Application August 12, 1946, Serial No. 689,882

7 Claims. (Cl. 217—93)

Our present invention has for its object to provide connecting members for the ends of hoop sections employed on the sections of knockdown barrels which embody means for securing them together with the hoop ends to the barrel staves.

Another object of our invention is to provide such a hoop connecting member having overlapping tongues or leaves between which the end of a hoop section is secured which are provided with a spur or tang integral with one of said tongues for penetrating a barrel stave to secure said parts thereto.

Our invention further comprehends the making of a hoop connecting member of a metal strap bent to form an eye with overlapping leaves one of which is provided with an integral spur or tang which when the leaves are closed together upon an interposed hoop end serve to secure the member thereto and also provide a projection which may be driven into a barrel stave to secure the parts thereto.

Another object of our invention is to provide a connection which is also adapted for use in conjunction with a so-called combination hoop and liner employed for reinforcing the ends of barrel staves, said connection serving to secure both parts on opposite sides of the stave.

To these and other ends our invention embodies further improvements in the construction and arrangement of the parts, all as will be fully described in the accompanying specification, the novel features thereof being set forth in the appended claims.

In the drawings:

Figure 1 is a perspective view of a portion of a barrel or tobacco hogshead showing the application thereto of devices embodying our invention.

Figure 2 is an enlarged plan view of a barrel section showing the manner of applying hoop sections equipped with connecting members constructed in accordance with our invention applied thereto.

Figure 3 is a sectional view taken on the line $3x$—$3x$ of Fig. 2.

Figure 4 is a perspective view of a cooperating hoop connecting member embodying our invention.

Figure 5 is a side view of the connecting member shown in Fig. 4 in the operation of affixing it to a hoop end.

Figure 6 is a sectional view illustrating the manner in which the tang or spur on the connecting member secures it to the stave.

Figure 7 is a perspective view showing modified form of hoop connection.

Figure 8 is a perspective view showing the extremity of a hoop section forming a stave reinforcement as seen from its inner or liner side.

Figure 9 is a similar view showing the end of a hoop section as viewed from its outer or hoop side.

Similar reference characters indicate similar parts.

In the fabrication of knockdown barrels particularly tobacco hogsheads, such as shown in Fig. 1, in which the staves 10 are comparatively thin it becomes a problem to satisfactorily attach the ends of the hoop sections thereto since at these points the so-called hinge members, or connecting elements, necessarily enhance the thickness of these parts in the areas of their attachment and the connection should be made in a manner which does not weaken the underlying edges of the staves. In constructing barrels there are two different sets of hoops, those which lie at the two ends and those surrounding the body at intermediate points examples of both of which are shown in Figs. 1 and 2.

The intermediate hoops are formed in sections 11 and 12 and the end hoops in sections 13 and 14 and the elements for connecting their ends are adapted for use with both forms. The sections 11 and 12 of the central or intermediate hoops are metal straps the ends of which are offset slightly and perforated for a purpose to be presently described. The end hoops are made as shown in Figs. 8 and 9 provided a reinforcement for the ends of the staves by enclosing them within a top section 15 and an inner flange or liner 16, the latter also being shaped to provide a plurality of inwardly extending projections 17 which serve for securing the barrel head when in the body of the barrel as will be understood. The ends of the hoop parts of sections 13 and 14 are provided with outwardly extending embossures 18 and they and the liner 16 are perforated as shown, as will be later explained.

In carrying out our invention we have provided a hoop connection comprising two similar members A and B one having a single eye $a$ fitting between two eyes $b$ on the other member to be interlocked therewith by a pintle 13$^a$ (see Figs 1 and 2). These members are constructed with overlapping leaves one of which, as indicated by 19, is on the inner side and lies in flat engagement with the outer face of a stave, the second leaf, indicated by 20, being on the outer side of the connection and overlying the hoop.

In forming the eyes *a* and *b* they are curled outwardly from planes of the two leaves as shown.

On a hoop connecting element embodying our invention we form on the upper outer leaf 20 a spur or projection 21. This is made in triangular formation, as shown particularly in Fig. 4, and is preferably formed integral with said leaf by a punch and die operation which cuts the metal along diverging lines 22 and 23, extending from a central point on the leaf in rear of the eye *a* or eyes *b*, and turns the severed portion inwardly on the line 24 thus forming a pointed and somewhat sharpened projection. The overall length of the spur 21, thus formed, is sufficient to pierce a stave and provide an extremity which may be clouted against the inner face of the stave, thus drawing the leaves 19 and 20 of the connecting member into close engagement with the outer face of the stave and securely binding the hoop thereon.

When the outer leaf 20 is closed upon the inner leaf 19 it may either puncture the enclosed hoop end, or if preferred, as would be the case when the hoops are made of hard metal, they are provided with a suitable aperture, to receive the prong, as indicated at 25 in Figs. 8 and 9. This aperture registers with one of similar shape, as indicated at 26, in the lower leaf 19 which is so placed that its outer edge forms an abutment against which the rear edge of the prong engages thus forming an engaging shoulder which will support the prong against any heavy strains imposed upon the hoops when a completed barrel is heavily loaded under pressure, or when such a loaded barrel is subjected to rough handling during transportation.

If desired, and as a further feature of our invention, in order to distribute the strain imposed upon the hoops over a wide area, we also provide on the upper leaf 20 a series of small projections which penetrate the outer face of the stave. These are arranged in pairs, such as 27 and 28 located adjacent the eyes *a* or *b* and 29 and 30 positioned at the corners of leaf 20 in rear of the base 24 of spur 21. These several projections are struck from the leaf in the same manner as that in which the spur 21 is formed and pass through corresponding apertures in the ends of the hoop and register with apertures 27ª, 28ª, 29ª and 30ª in leaf 19 the rear edges of each of which form a shoulder or abutment for its corresponding projection. These last mentioned projections not only serve to resist the strain between the hoop per se and the connections but also to distribute it over a wider transverse area of the underlying barrel stave.

The ends of the liners 16 of the end hoops are provided with apertures 31 which register with the apertures 25 in outer hoop, to receive the end of the spur 21. Upsetting or peening the extremity of the latter serves to draw all of the parts into tight engagement with the inner and outer faces of the intervening stave.

In Fig. 7 we have shown a modification of the hoop connection comprising inner and outer leaves 32 and 33, the spur or prong 34 being struck up from the inner leaf. In forming this structure a narrow space is provided between the contiguous faces of the leaves which is just sufficient to permit the insertion of a hoop end, as shown in dotted lines, where it is held frictionally while a permanent connection is effected by spot welding the three parts together.

What we claim and desire to protect by Letters Patent is:

1. The combination with a hoop section for sectional barrels composed of staves, of members for connecting such hoop sections together at their ends, said members comprising plates bent to form overlapping leaves and intermediate eyes, the lower leaf and the corresponding hoop end each being provided with a plurality of registering apertures, and projections corresponding to each of said apertures on the outer leaf extending through the hoop lower leaf and beyond the lower face of the latter for penetrating the underlying barrel staves.

2. The combination with an end hoop for reinforcement for the staves of sectional barrels comprising an outer hoop portion and an inner liner portion engaging opposite faces of the barrel staves, of members for connecting such reinforcements together embodying plates bent to form overlapping leaves with intermediate eyes for the reception of a pintle, the lower one of said leaves, the hoop and the liner being provided with alined apertures, and a pointed projection on the outer leaf passing through all of said apertures and clouted against the inner side of said liner to draw said parts into intimate union with the opposite faces of the enclosed end of a stave.

3. The combination with an end hoop for reinforcement for the staves of sectional barrels comprising an outer hoop portion and an inner liner portion engaging opposite faces of the barrel staves at their ends, of members for connecting such reinforcements together embodying plates bent to form overlapping leaves with intermediate eyes for the reception of a pintle, the lower one of said leaves, the hoop and the liner being provided with major alined apertures and the plate and hoop also having other minor registering apertures, a projection on the outer leaf adapted to extend through said major apertures and through the stave, and other shorter projections on the outer leaf which extend through said minor apertures and enter the outer face of the stave.

4. The combination with a hoop section for sectional barrels composed of staves, of members for connecting such hoop sections together at their ends, said members comprising plates bent to form overlapping leaves and an intermediate eye, one of the leaves and the corresponding hoop end being provided with registering apertures, and a projection corresponding to said apertures on the other leaf and extending through the hoop, leaf and beyond the lower face of the latter for penetrating the underlying barrel staves.

5. The combination with a hoop section for sectional barrels composed of staves, of members for connecting such hoop sections together at their ends, said members comprising plates bent to form overlapping leaves and an intermediate eye, one of the leaves and the corresponding hoop end being provided with registering apertures, and a projection corresponding to said apertures on the other leaf and extending through the hoop, leaf and beyond the lower face of the latter for penetrating the underlying barrel staves, beyond the surface thereof and clouted over to unite said members, hoops and staves together.

6. The combination with a hoop section for sectional barrels composed of stave members for connecting such hoop sections together at their ends, said members comprising plates bent to form overlapping leaves with intermediate eyes for the reception of a pintle, the lower one of said leaves and the corresponding hoop end being provided with major aligned apertures and minor aligned apertures, a projection on the outer leaf adapted to extend through said major apertures and through the stave, and other shorter projections on the outer leaf which extend through said minor apertures and enter the outer face of the stave.

7. The combinatioin with a hoop section for sectional barrels composed of staves, of members for connecting such hoop sections together at their ends, said members comprising plates bent to form overlapping leaves and an intermediate eye, one of the leaves and the corresponding hoop end being provided with registering apertures, and a projection corresponding to said apertures on the other leaf and extending through the hoop, leaf and beyond the lower face of the latter for penetrating the underlying barrel staves, and at least one other shorter projection on one of the leaves projecting through registering apertures in the hoop end and the other leaf.

HARRY GUTHRIE BELL.
JACOB DOUGLAS GAY, Jr.

REFERENCES CITED

The following references are of record in the file of this patent:

UNITED STATES PATENTS

| Number | Name | Date |
|---|---|---|
| 663,423 | Dedrick | Dec. 11, 1900 |
| 924,649 | Emmrich | June 15, 1909 |
| 2,138,847 | Felix | Dec. 6, 1938 |
| 2,375,122 | McConnel | May 1, 1945 |

FOREIGN PATENTS

| Number | Country | Date |
|---|---|---|
| 825 | Great Britain | Jan. 13, 1903 |